United States Patent
Tangirala et al.

(10) Patent No.: US 10,221,763 B2
(45) Date of Patent: Mar. 5, 2019

(54) COMBUSTOR FOR ROTATING DETONATION ENGINE AND METHOD OF OPERATING SAME

(71) Applicant: General Electric Company, Schenectady, NY (US)

(72) Inventors: Venkat Eswarlu Tangirala, Niskayuna, NY (US); Andrew Maxwell Peter, Saratoga Springs, NY (US); Kapil Kumar Singh, Rexford, NY (US); Keith Robert McManus, Clifton Park, NY (US); Joel Haynes, Niskayuna, NY (US); Anthony Dean, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 6 days.

(21) Appl. No.: 15/390,105

(22) Filed: Dec. 23, 2016

(65) Prior Publication Data

US 2018/0179953 A1    Jun. 28, 2018

(51) Int. Cl.
*F02C 5/02* (2006.01)
*F02C 3/16* (2006.01)
(Continued)

(52) U.S. Cl.
CPC .............. *F02C 5/02* (2013.01); *F02C 3/04* (2013.01); *F02C 3/14* (2013.01); *F02C 3/16* (2013.01); *F02C 3/165* (2013.01); *F02C 5/00* (2013.01); *F02C 5/10* (2013.01); *F02C 7/264* (2013.01); *F02K 7/075* (2013.01); *F02K 7/08* (2013.01);
(Continued)

(58) Field of Classification Search
CPC ...... F02C 3/04; F02C 3/14; F02C 3/16; F02C 3/165; F02C 5/00; F02C 5/02; F02C 5/04; F02C 5/10; F02C 5/11; F02C 5/12; F02K 7/00; F02K 7/005; F02K 7/02; F02K 7/04; F02K 7/06; F02K 7/067; F02K 7/075;
(Continued)

(56) References Cited

U.S. PATENT DOCUMENTS 6,666,018 B2    12/2003    Butler et al.
6,883,302 B2    4/2005    Koshoffer
(Continued)

OTHER PUBLICATIONS

Xiaofeng, L. et al.; Experimental Investigations on the Power Extraction of a Turbine Driven by a Pulse Detonation Combustor, Chinese Journal of Aeronautics, 2013, pp. 1353-1359.

*Primary Examiner* — Scott J Walthour
(74) *Attorney, Agent, or Firm* — GE Global Patent Operation; John Darling

(57) ABSTRACT

A combustor is configured to operate in a rotating detonation mode and a deflagration mode. The combustor includes a housing and at least one initiator. The housing defines at least one combustion chamber and is configured for a deflagration process to occur within the at least one combustion chamber during operation in the deflagration mode and a rotating detonation process to occur within the at least one combustion chamber during operation in the rotating detonation mode. The at least one initiator is configured to initiate the rotating detonation process within the at least one combustion chamber during operation in the rotating detonation mode and to initiate the deflagration process within the at least one combustion chamber during operation in the deflagration mode.

2 Claims, 8 Drawing Sheets

(51) Int. Cl.
  *F02C 7/264* (2006.01)
  *F23R 7/00* (2006.01)
  *F02C 3/04* (2006.01)
  *F02K 7/08* (2006.01)
  *F02K 7/075* (2006.01)
  *F02C 5/10* (2006.01)
  *F02C 5/00* (2006.01)
  *F02C 3/14* (2006.01)
  *F23R 3/34* (2006.01)
  *F23R 3/42* (2006.01)
  *F23R 3/28* (2006.01)
  *F23R 3/56* (2006.01)

(52) U.S. Cl.
  CPC ............... *F23R 3/286* (2013.01); *F23R 3/34* (2013.01); *F23R 3/42* (2013.01); *F23R 3/56* (2013.01); *F23R 7/00* (2013.01); *F05D 2220/32* (2013.01); *F05D 2240/35* (2013.01)

(58) Field of Classification Search
  CPC .... F02K 7/08; F02K 7/20; F23R 3/286; F23R 3/42; F23R 3/56; F23R 7/00
  See application file for complete search history.

(56) References Cited

U.S. PATENT DOCUMENTS

| | | | |
|---|---|---|---|
| 6,983,586 | B2 | 1/2006 | Tangirala et al. |
| 7,950,219 | B2 | 5/2011 | Tangirala et al. |
| 8,438,833 | B2 | 5/2013 | Tangirala et al. |
| 2005/0279083 | A1* | 12/2005 | McManus ............... F02K 7/04 60/247 |
| 2008/0098748 | A1* | 5/2008 | Tangirala ............... F02K 3/06 60/804 |
| 2009/0139203 | A1 | 6/2009 | Rasheed et al. |
| 2012/0102916 | A1* | 5/2012 | Bunker ................... F02C 5/11 60/247 |

\* cited by examiner

COMBUSTOR FOR ROTATING DETONATION ENGINE AND METHOD OF OPERATING SAME

BACKGROUND

The field of the invention relates generally to combustors for turbine engines, and more particularly, to dual mode combustors for rotating detonation engines.

In rotating detonation engines and, more specifically, in rotating detonation combustors, a mixture of fuel and an oxidizer is ignited such that combustion products are formed. For example, the combustion process begins when the fuel-oxidizer mixture in a tube or a pipe structure is ignited via a spark or another suitable ignition source to generate a compression wave. The compression wave is followed by a chemical reaction that transitions the compression wave to a detonation wave. The detonation wave enters a combustion chamber of the rotating detonation combustor and travels along the combustion chamber. Air and fuel are separately fed into the rotating detonation combustion chamber and are consumed by the detonation wave. As the detonation wave consumes air and fuel, combustion products traveling along the combustion chamber accelerate and are discharged from the combustion chamber.

However, during at least some stages of operation such as start-up and partial load stages, conditions are not sufficient to sustain a rotating detonation combustion process. At such combustor operating conditions, the pressure and/or temperature within the combustion chamber are not sufficient to sustain the constant volume combustion of the rotating detonation combustion process. Accordingly, during at least some stages of operation, such as during start-up, rotating detonation combustion does not occur or occurs at less than the ideal efficiency.

BRIEF DESCRIPTION

In one aspect, a combustor for a turbine assembly is provided. The combustor is configured to operate in a rotating detonation mode and a deflagration mode. The combustor includes a housing and at least one initiator. The housing defines at least one combustion chamber and is configured for a deflagration process to occur within the at least one combustion chamber during operation in the deflagration mode and a rotating detonation process to occur within the at least one combustion chamber during operation in the rotating detonation mode. The at least one initiator is configured to initiate the rotating detonation process within the at least one combustion chamber during operation in the rotating detonation mode and to initiate the deflagration process within the at least one combustion chamber during operation in the deflagration mode.

In another aspect, a turbine engine is provided. The turbine engine includes a compressor configured to increase pressure of a fluid flow and a combustor coupled in flow communication with the compressor. The combustor is configured to receive pressurized fluid flow from the compressor and operate in a rotating detonation mode and a deflagration mode. The combustor includes a housing defining at least one combustion chamber. The combustor is configured for a deflagration process to occur within the at least one combustion chamber during operation in the deflagration mode and a rotating detonation process to occur within the at least one combustion chamber during operation in the rotating detonation mode. The combustor also includes at least one initiator. The at least one initiator is configured to initiate the rotating detonation process within the at least one combustion chamber during operation in the rotating detonation mode and to initiate the deflagration process within the at least one combustion chamber during operation in the deflagration mode. The turbine engine also includes a turbine coupled in flow communication with the combustor. The turbine is configured to receive combustion flow from the combustor.

In another aspect, a method of operating a turbine engine assembly is provided. The turbine engine assembly includes a combustor configured to operate in a rotating detonation mode and a deflagration mode. The method includes directing a pressurized fluid flow into at least one combustion chamber of a combustor. The method also includes initiating a deflagration process within the at least one combustion chamber during operation in the deflagration mode. The method further includes initiating a rotating detonation process within the at least one combustion chamber during operation in the rotating detonation mode.

DRAWINGS

These and other features, aspects, and advantages of the present disclosure will become better understood when the following detailed description is read with reference to the accompanying drawings in which like characters represent like parts throughout the drawings, wherein.

Figure 1:
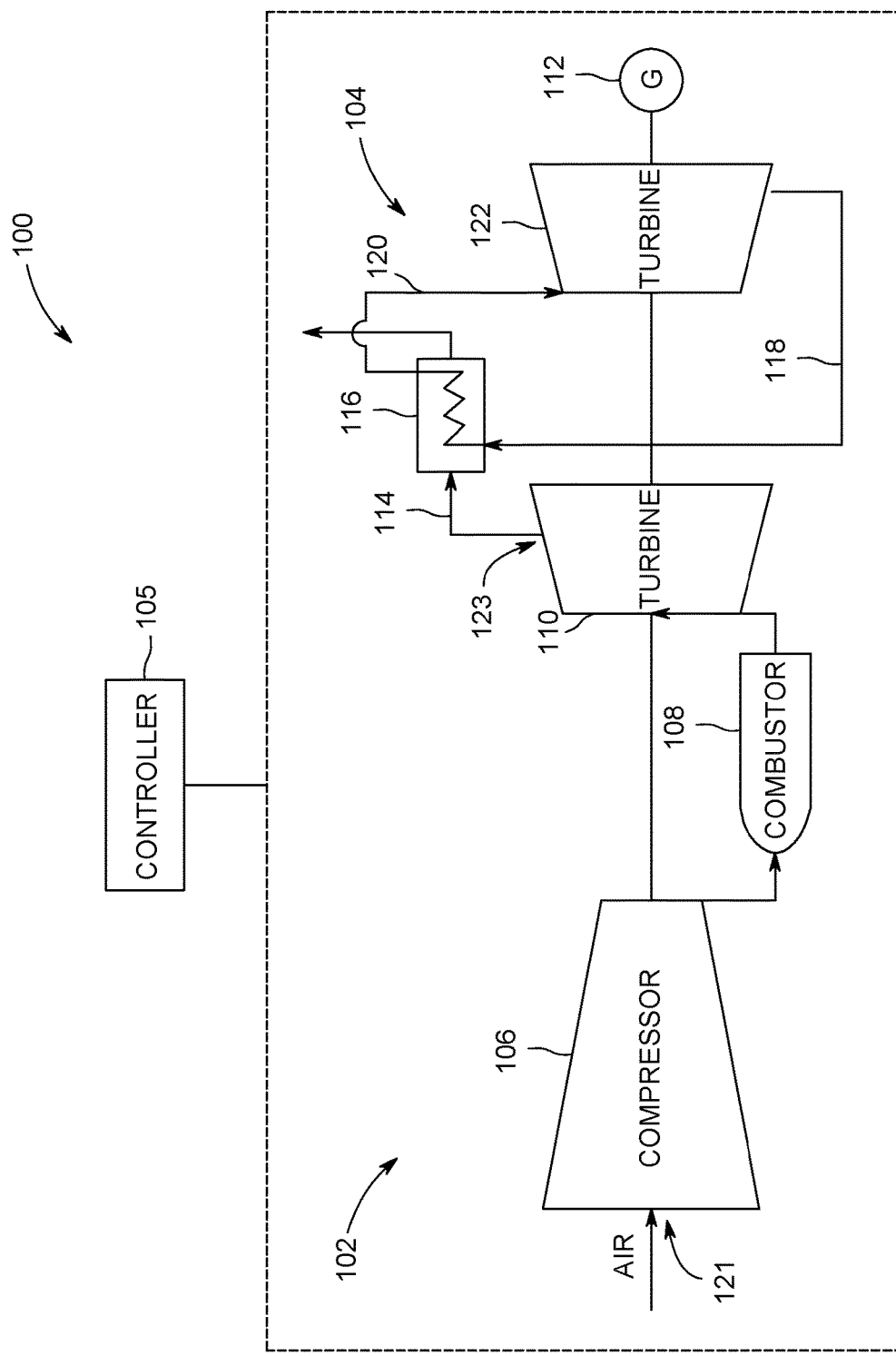
FIG. 1 is a schematic illustration of an exemplary combined cycle power generation system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged; such ranges are identified and include all the sub-ranges contained therein unless context or language indicates otherwise.

The systems and methods described herein provide a dual mode combustor that operates in a deflagration mode and a rotating detonation mode. In particular, the dual mode combustor operates in the deflagration mode when an operating condition, such as pressure and/or temperature within a combustion chamber, is outside requirements for rotating detonation combustion. The dual mode combustor operates in the rotating detonation mode when operating conditions meet requirements for rotating detonation combustion. In particular, in the rotating detonation mode, detonations continuously travel around the combustion chamber and produce near constant volume combustion within the combustion chamber of the dual mode combustor. As a result, the dual mode combustor is configured to operate within a wider range of operating conditions and provides increased operating efficiency. For example, in some embodiments, the dual mode combustor operates from start-up to power-down of a turbine engine.

As used herein, a "detonation chamber" refers to any combustion device or system where a series of repeating detonations or quasi-detonations within the device cause a pressure rise and subsequent acceleration of the combustion products as compared to the pre-burned reactants. A "quasi-detonation" is a combustion process that produces a pressure rise and velocity increase higher than the pressure rise produced by a deflagration wave. Throughout this disclosure, the terms "detonation" and "quasi-detonation" are used interchangeably. Typical embodiments of detonation chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the detonation chamber exhaust to produce a thrust force. In addition, rotating detonation combustors are designed such that a substantially continuous detonation wave is produced and discharged therefrom. As known to those skilled in the art, detonation may be accomplished in a number of types of detonation chambers, including detonation tubes, shock tubes, resonating detonation cavities, and annular detonation chambers.

FIG. 1 is a schematic illustration of an exemplary combined cycle power generation system 100. Power generation system 100 includes a gas turbine engine assembly 102, a steam turbine engine assembly 104, and a controller 105. Gas turbine engine assembly 102 includes a compressor 106, a combustor 108, and a first turbine 110 powered by expanding hot gas produced in combustor 108 for driving an electrical generator 112. Gas turbine engine assembly 102 may be used in a stand-alone simple cycle configuration for power generation or mechanical drive applications. In the exemplary embodiment, exhaust gas 114 is channeled from first turbine 110 towards a heat recovery steam generator (HRSG) 116 for recovering waste heat from exhaust gas 114. More specifically, HRSG 116 transfers heat from exhaust gas 114 to water/steam 118 channeled through HRSG 116 to produce steam 120. Steam turbine engine assembly 104 includes a second turbine 122 that receives steam 120, which powers second turbine 122 for further driving electrical generator 112.

In operation, air enters gas turbine engine assembly 102 through an intake 121 and is channeled through multiple stages of compressor 106 towards combustor 108. Compressor 106 compresses the air and the highly compressed air is channeled from compressor 106 towards combustor 108 and mixed with fuel. The fuel-air mixture is combusted within combustor 108. High temperature combustion gas generated by combustor 108 is channeled towards first turbine 110. Exhaust gas 114 is subsequently discharged from first turbine 110 through an exhaust 123.

Figure 2:
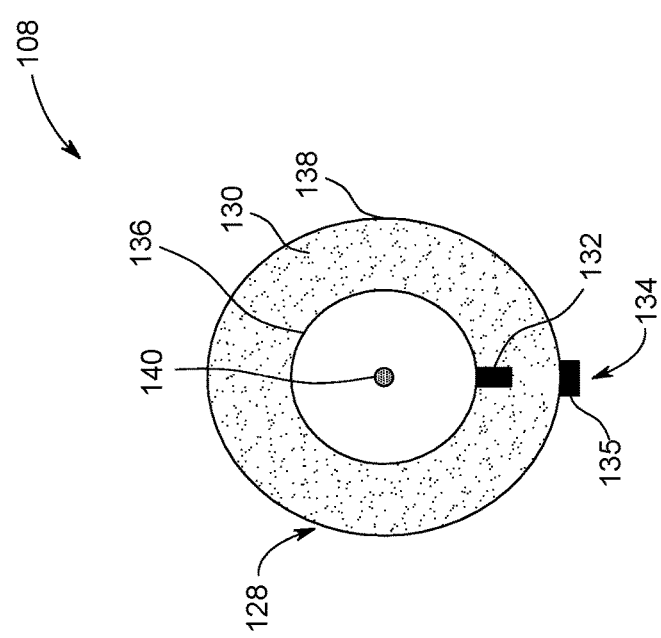
FIG. 2 is a schematic end view of a combustor of the combined cycle power generation system shown in FIG. 1.

FIG. 2 is a schematic end view of combustor 108. In the exemplary embodiment, combustor 108 includes a housing 128 defining a combustion chamber 130. In addition, combustor 108 includes a first ignitor 132 and a second ignitor 134, broadly initiators. First ignitor 132 is used to initiate a deflagration process within combustion chamber 130. In the exemplary embodiment, first ignitor 132 includes a spark plug or any other combustion kernel generator (such as a laser ignition) and is used to initiate a deflagration flame and/or a combustion wave. Second ignitor 134 is used to initiate a rotating detonation process within combustion chamber 130. Accordingly, combustion chamber 130 is a detonation chamber. In the exemplary embodiment, second ignitor 134 includes a pulse detonation engine (PDE) tube 135 receiving a fuel-air mixture. A detonation wave is generated in PDE tube 135. The detonation wave propagates and diffracts into combustion chamber 130. PDE tube 135 is coupled to outer side wall 138 of housing 128 and extends tangentially relative to outer side wall 138. In alternative embodiments, combustor 108 includes any initiator that enables system 100 to operate as described herein. In some embodiments, combustor 108 includes a spark and/or plasma ignitor. In further embodiments, combustor 108 includes a predetonation initiator.

In the exemplary embodiment, housing 128 includes a radially inner side wall 136 and a radially outer side wall 138 that both extend circumferentially relative to a longitudinal axis 140 of combustor 108. Combustion chamber 130 is defined between radially inner side wall 136 and radially outer side wall 138. As such, combustion chamber 130 is substantially annular. In alternative embodiments, combustor 108 includes any combustion chamber 130 that enables combustor 108 to operate as described herein. For example, in some embodiments, combustor 108 includes separate chambers for the deflagration and rotating detonation processes. In further embodiments, combustion chamber 130 is any suitable geometric shape and does not necessarily include an inner liner and/or central body. For example, in some embodiments, combustion chamber 130 is substantially cylindrical.

Also, in the exemplary embodiment, combustion chamber 130 is configured to receive airflow, broadly an oxidizer flow, and a fuel flow. In some embodiments, combustion chamber 130 is configured to receive a cooling flow to cool combustion chamber 130. For example, in some embodiments, both oxidizer flow and cooling flow are supplied by bleed air from compressor 106 (shown in FIG. 1). As used herein, the term "air" refers to an oxidizer. For example, in some embodiment, air includes oxygen and/or compressed air. A few examples of fuel types include, without limitation, hydrogen, distillate fuel, and natural gas. In alternative embodiments, combustion chamber 130 is configured to receive any flow that enables combustor 108 to operate as described herein.

Figure 3:
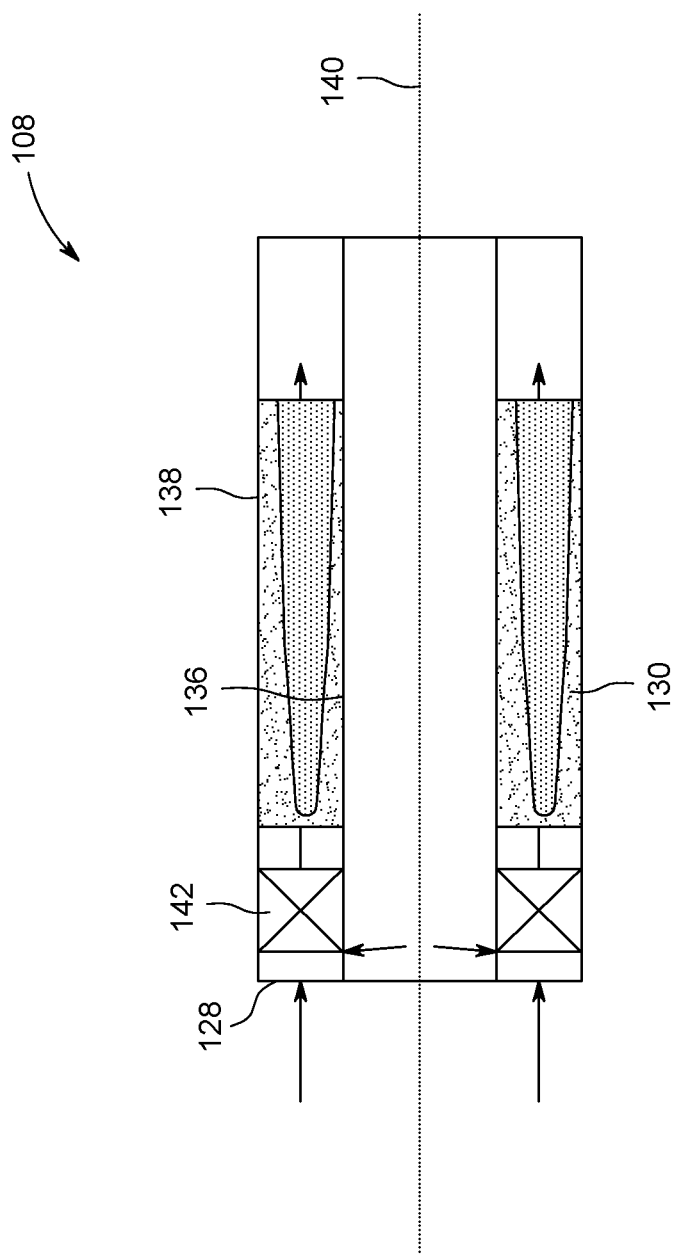
FIG. 3 is a sectional schematic view of the combustor shown in FIG. 2 configured to operate in a first mode.
Figure 4:
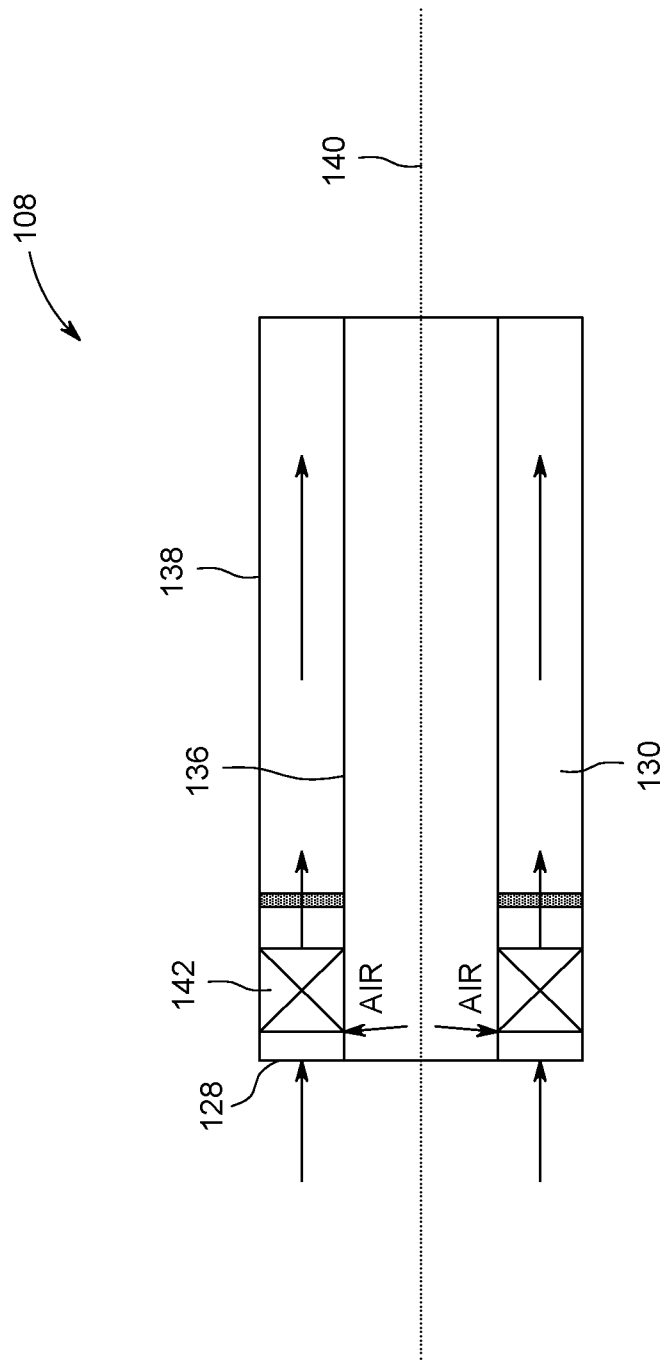
FIG. 4 is a sectional schematic view of the combustor shown in FIG. 2 configured to operate in a second mode.

FIG. 3 is a sectional schematic view of combustor 108 configured to operate in a first mode. FIG. 4 is a sectional schematic view of combustor 108 configured to operate in a second mode. In the first mode, i.e., a deflagration mode, combustor 108 is configured for deflagration processes to occur within combustion chamber 130. In the second mode, i.e., a rotating detonation mode, combustor 108 is configured for rotating detonation processes to occur within combustion chamber 130. In alternative embodiments, combustor 108 is configured in any mode that enables combustor 108 to operate as described herein. For example, in some embodiments, combustor 108 operates in a mode where rotating detonation and deflagration processes occur substantially simultaneously.

In the exemplary embodiment, combustor 108 further includes a fuel-air mixing element 142 to provide a fuel-air mixture to combustion chamber 130. In some embodiments, a regulating component, such as a high frequency fuel control valve, regulates fuel and/or oxygen flow to fuel-air mixing element 142. In such embodiments, controller 105 is configured to control the regulating component and/or fuel-air mixing element 142 and the fuel-air mixture provided to combustion chamber 130. In alternative embodiments, combustion chamber 130 includes any mixing element that enables combustor 108 to operate as described herein. For example, in some embodiments, combustor 108 includes, without limitation, any of the following: a hypermixer, a swirler, a cavity, and any other mixing element.

During operation, compressor 106 provides compressed gas to combustor 108. Combustor 108 receives the compressed gas and performs a combustion process. In the first mode, first ignitor 132 initiates a deflagration process within combustion chamber 130. In the second mode, second ignitor 134 initiates a detonation process. The deflagration process occurs at lower pressure conditions and lower temperature conditions than the detonation process. Accordingly, combustor 108 operates in lower pressure conditions and lower temperature conditions in the first mode than in the second mode. For example, the first mode is used during stages such as start-up and low power conditions of combustor 108. As a result, combustor 108 is configured to operate throughout a wider range of operating conditions of combined cycle power generation system 100 (shown in FIG. 1) than combustors that perform only detonation processes. In alternative embodiments, combustor 108 performs any combustion process that enables system 100 to operate as described herein.

In the first mode, the deflagration process occurs substantially throughout the annular space of combustion chamber 130. The deflagration process provides a varying volume combustion that occurs at a lower pressure than detonation combustion. The deflagration combustion is subsonic and is sustained by heat transfer between the combustion products and the fuel-air mixture. In the second mode, detonations or quasi-detonations continuously travel about combustion chamber 130. As a result, pressure is rapidly elevated within combustion chamber 130 before a substantial amount of gas escapes from combustion chamber 130. Accordingly, combustor 108 provides inertial confinement to produce near constant volume combustion during operation in the second mode.

In reference to FIGS. 1 and 2, in the exemplary embodiment, compressor 106 has a reduced number of compressor stages because combustor 108 increases the pressure of the pressurized air during the rotating detonation process. For example, in the exemplary embodiment, compressor 106 includes 10 to 12 stages. However, the pressurized air moving through system 100 has a pressure equivalent to the pressure of airflow through at least some systems that include compressors having more stages because combustor 108 increases the pressure of the pressurized air. In alternative embodiments, compressor 106 includes any stage that enables system 100 to operate as described herein.

Figure 5:
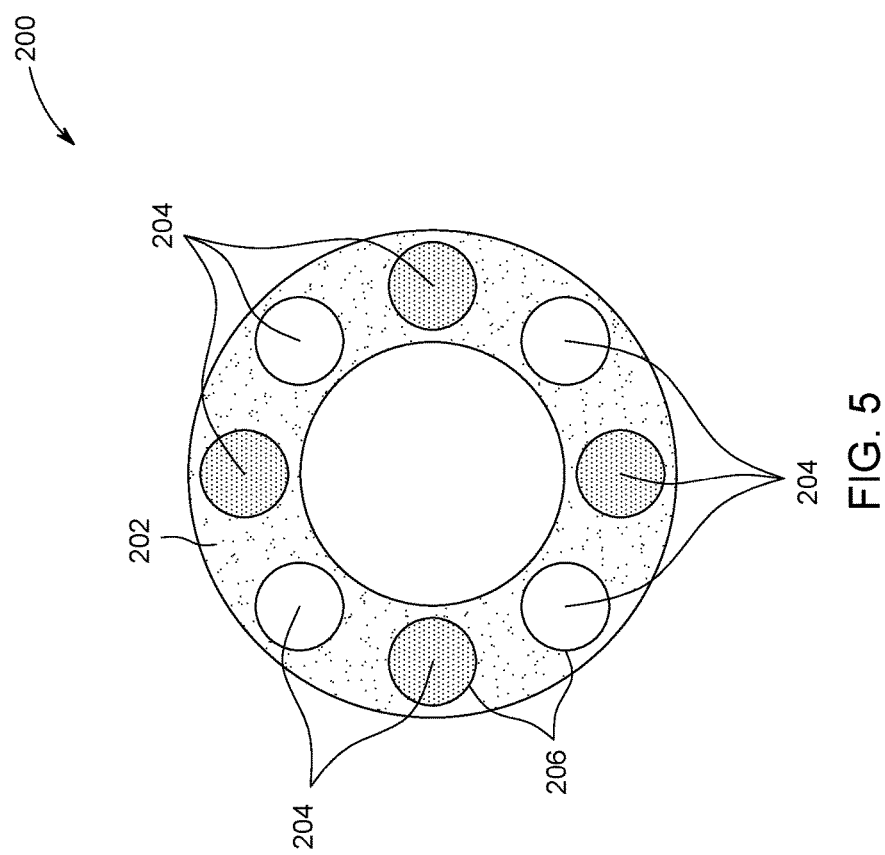
FIG. 5 is a schematic end view of an alternative embodiment of a combustor for use with the combined cycle power generation system shown in FIG. 1 including a plurality of cans within a combustion chamber.
Figure 6:
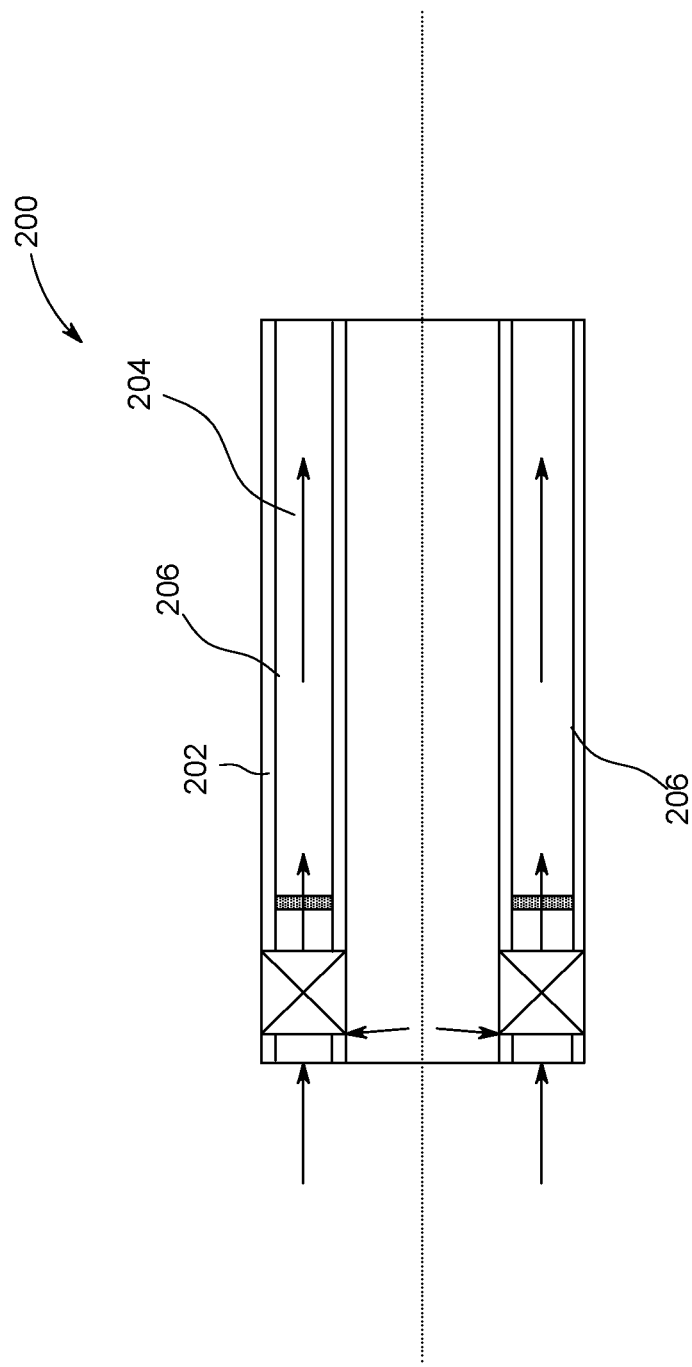
FIG. 6 is a sectional schematic view of the combustor shown in FIG. 5.

FIG. 5 is a schematic end view of an alternative embodiment of a combustor 200 for use with power generation system 100 (shown in FIG. 1). FIG. 6 is a sectional schematic view of combustor 200. Combustor 200 includes a combustion chamber 202. Combustion chamber 202 has an annular shape and includes a plurality of annularly spaced combustion cans 204. Accordingly, combustor 200 is a canannular combustor. In alternative embodiments, combustor 200 is any combustor that enables power generation system 100 (shown in FIG. 1) to operate as described herein.

In the exemplary embodiment, each can 204 is configured for use in a deflagration process when combustor 200 operates in a first mode. In addition, each can 204 is configured for use in a detonation process when combustor 200 operates in a second mode. Cans 204 are separated from each other by liners 206 which extend longitudinally along combustion chamber 202. Cans 204 are in fluid communication with each other to facilitate combustion products flowing between cans 204. In addition, cans 204 are configured to enable rotating detonations to propagate circumferentially from can 204 to can 204. In some embodiments, some cans 204 are configured to operate in only one mode of combustor 200. For example, in reference to FIG. 5, shaded cans 204 are configured to operate in the first mode and unshaded cans 204 are configured to operate in the second mode. In alternative embodiments, combustor 202 includes any can 204 that enables combustor 200 to operate as described herein. For example, in some embodiments, each can 204 forms an annulus.

During operation, each can 204 is provided a fuel-air mixture and performs a combustion process. In the first mode, a deflagration process is ignited within at least one can 204 such that combustion products travel through can 204 and are exhausted from combustor 200. In the second mode, a detonation process is initiated in at least one can 204 and a detonation wave is formed. Energy from the initial detonation process travels about combustion chamber 202 from can 204 to can 204 initiating a chain reaction of detonations within cans 204. In the exemplary embodiment, combustion occurs within substantially all cans 204 during operation in the first mode and/or the second mode. In alternative embodiments, combustor 108 performs any combustion process that enables system 100 to operate as described herein.

Figure 7:
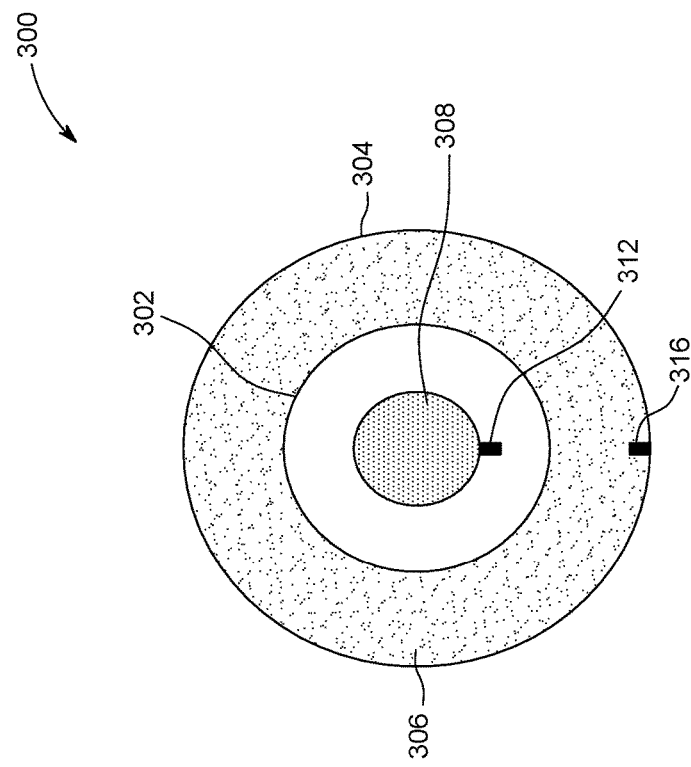
FIG. 7 is a schematic end view of an alternative embodiment of a combustor for use with the combined cycle power generation system shown in FIG. 1 including a plurality of combustion chambers.
Figure 8:
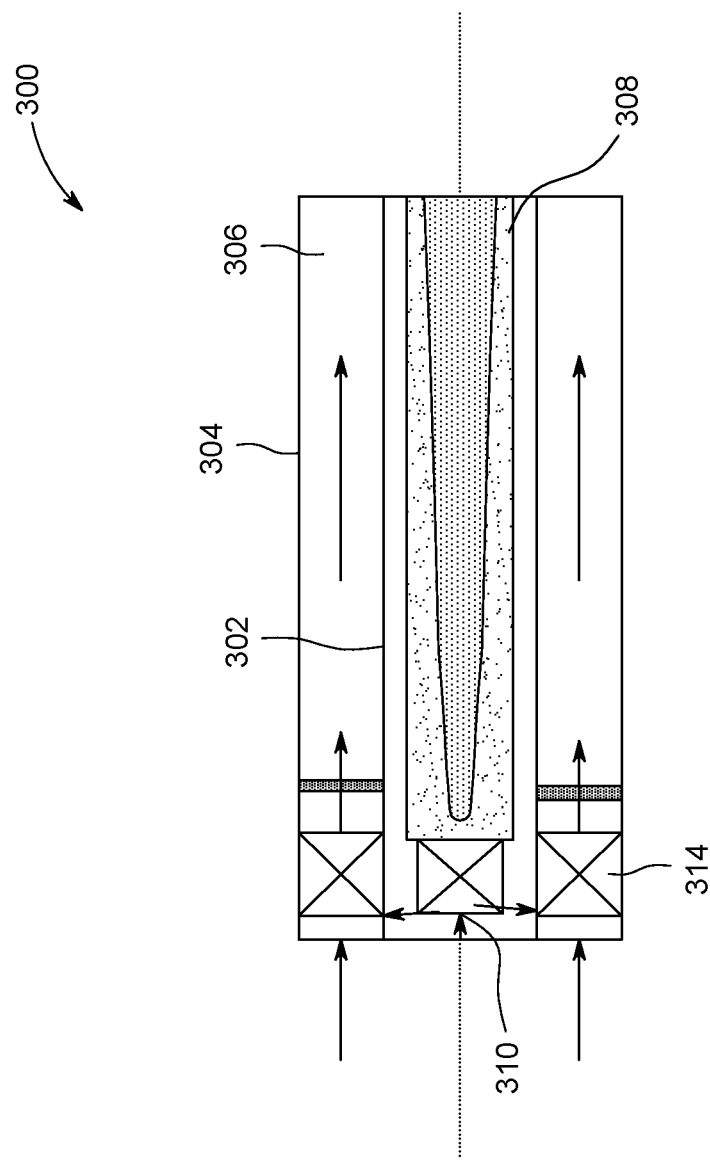
FIG. 8 is a sectional schematic view of the combustor shown in FIG. 7.

FIG. 7 is a schematic end view of an alternative embodiment of a combustor 300 for use with power generation system 100 (shown in FIG. 1) including a plurality of combustion chambers. FIG. 8 is a sectional schematic view of combustor 300. Combustor 300 includes an inner wall 302 and an outer wall 304. Inner wall 302 and outer wall 304 define an outer combustion chamber 306 therebetween. Inner wall 302 and outer wall 304 have a cylindrical shape and outer combustion chamber 306 has an annular shape. Inner wall 302 defines an inner combustion chamber 308 therein. Accordingly, inner combustion chamber 308 has a cylindrical or annular shape and is circumscribed by outer combustion chamber 306. In alternative embodiments, combustor 300 includes any combustion chamber that enables combustor 300 to operate as described herein.

In the exemplary embodiment, in the first mode, combustor 300 is configured for deflagration processes to occur within inner combustion chamber 308. In the second mode, combustor 300 is configured for rotating detonation processes to occur within outer combustion chamber 306. During operation, combustor 300 receives compressed gas and performs a combustion process. A first fuel-air mixer 310 provides a mixture of fuel and air to inner combustion chamber 308 and a first ignitor 312 initiates a deflagration process within inner combustion chamber 308. Combustion products from the deflagration process travel along inner combustion chamber 308 and exit combustor 300. A second fuel-air mixer 314 provides a mixture of fuel and air to outer combustion chamber 306 and a second ignitor 316 initiates a detonation process within outer combustion chamber 306. The detonation process forms a detonation wave and energy from the initial detonation process travels about outer combustion chamber 306 initiating a chain reaction of detonations within outer combustion chamber 306. In alternative embodiments, combustor 300 performs any combustion process that enables system 100 (shown in FIG. 1) to operate as described herein.

In reference to FIGS. 1 and 2, a method of operating combined cycle power generation system 100 includes operating combustor 108 in a deflagration mode when pressure and/or temperature of a pressurized fluid flow is below a threshold and operating combustion chamber 130 in a rotating detonation mode when the pressure and/or temperature of the pressurized fluid flow is above the threshold. The method also includes directing the pressurized fluid flow into combustion chamber 130 of combustor 108. The pressurized fluid flow includes a mixture of fuel and air. First ignitor 132 is used to ignite the pressurized fluid flow and initiate a deflagration process when combustor 108 is operating in the deflagration mode. Second ignitor 134 is used to ignite the pressurized fluid flow and initiate the rotating detonation process when combustor 108 is operating in the rotating detonation mode. In some embodiments, the method includes detecting a pressure and/or temperature of the pressurized fluid flow and comparing the detected pressure and/or temperature to a threshold. Controller 105 is configured to switch combustion chamber 130 between the rotating detonation mode and the deflagration mode when the pressure and/or temperature of the pressurized fluid flow crosses the threshold.

The above-described embodiments provide a dual mode combustor that operates in a deflagration mode and a rotating detonation mode. In particular, the dual mode combustor operates in the deflagration mode when an operating condition, such as pressure and/or temperature within a combustion chamber, is outside requirements for rotating detonation combustion. The dual mode combustor operates in the rotating detonation mode when operating conditions meet requirements for rotating detonation combustion. In particular, in the rotating detonation mode, detonations continuously travel around the combustion chamber and produce near constant volume combustion within the combustion chamber of the dual mode combustor. As a result, the dual mode combustor is configured to operate within a wider range of operating conditions and provides increased operating efficiency. For example, in some embodiments, the dual mode combustor operates from start-up to power-down of a turbine engine.

An exemplary technical effect of the methods, systems, and apparatus described herein includes at least one of: (a) increasing the efficiency of rotating detonation engines; (b) providing rotating detonation combustors that operate in a deflagration mode and a rotating detonation mode; (c) providing rotating detonation combustors that operate during a wider range of operating conditions; and (d) decreasing down-time of rotating detonation combustors.

Exemplary embodiments of methods, systems, and apparatus for a gas turbine engine are not limited to the specific embodiments described herein, but rather, components of systems and steps of the methods may be utilized independently and separately from other components and steps described herein. For example, the methods may also be used in combination with other combustors, and are not limited to practice with only the gas turbine engines and methods as described herein. Rather, the exemplary embodiment can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combustor for a turbine assembly, said combustor configured to operate in a rotating detonation mode and a deflagration mode, said combustor comprising:

a housing defining at least one combustion chamber, said housing configured for a deflagration process to occur within said at least one combustion chamber during operation in the deflagration mode and a rotating detonation process to occur within said at least one combustion chamber during operation in the rotating detonation mode; and at least one initiator configured to initiate the rotating detonation process within said at least one combustion chamber during operation in the rotating detonation mode and to initiate the deflagration process within said at least one combustion chamber during operation in the deflagration mode, wherein said at least one combustion chamber includes an inner combustion chamber and an outer combustion chamber, said housing configured for said deflagration processes to occur within said inner combustion chamber and said rotating detonation processes to occur within said outer combustion chamber, the inner combustion chamber being cylindrical and the outer combustion chamber being annular, and said at least one initiator including a first ignitor and a second ignitor, said first ignitor configured to initiate the deflagration process within said inner combustion chamber during operation in the deflagration mode, and said second ignitor configured to initiate the rotating detonation process within said outer combustion chamber during operation in the rotating detonation mode, the combustor further comprising:
a first fuel-air mixer that provides a first mixture of fuel and air to said inner combustion chamber; and
a second fuel-air mixer that provides a second mixture of fuel and air to said outer combustion chamber.

2. A turbine assembly comprising:
a compressor configured to increase pressure of a fluid flow;
the combustor according to claim 1 coupled in flow communication with said compressor, said combustor configured to receive pressurized fluid flow from said compressor during operation in the rotating detonation mode and the deflagration mode; and
a turbine coupled in flow communication with said combustor, said turbine configured to receive combustion flow from said combustor.

* * * * *